United States Patent [19]

Beerman

[11] Patent Number: 4,885,834
[45] Date of Patent: Dec. 12, 1989

[54] METHOD AND DEVICE FOR REMOVING WHEEL NUTS AND CAP NUTS FROM THE OUTER WHEEL OF A DUAL-WHEEL DOUBLE-NUT SYSTEM

[76] Inventor: Paul J. Beerman, 301 S. Second St., Atwater, Minn. 56205

[21] Appl. No.: 253,035

[22] Filed: Oct. 4, 1988

[51] Int. Cl.[4] .......................... B23P 19/00; B25B 9/00; B60B 11/00
[52] U.S. Cl. ..................... 29/426.5; 29/240; 81/13; 152/376; 301/36 R; 403/22; 411/96; 411/98
[58] Field of Search ................. 29/426.5, 240; 411/87, 411/93, 94, 96, 98, 191, 192, 198, 197, 204; 152/375, 376; 403/22; 285/23, 363, 405; 81/10, 13; 301/36 R, 115

[56] References Cited

U.S. PATENT DOCUMENTS

| | | | |
|---|---|---|---|
| 25,916 | 8/1896 | Bernard | 411/94 X |
| 1,337,084 | 4/1920 | Libenschek | 81/13 |
| 2,196,929 | 4/1940 | Lizakowski | 81/13 |
| 2,305,274 | 12/1942 | Power | 81/13 UX |
| 2,359,555 | 10/1944 | Herreshoff et al. | 403/22 |
| 2,387,545 | 10/1945 | Veney | 81/13 |
| 3,170,347 | 2/1965 | Brye | 81/13 X |
| 3,491,427 | 1/1970 | Zimmerman et al. | 29/240 |
| 3,713,686 | 1/1973 | Eddy et al. | 411/96 |
| 3,741,603 | 6/1973 | McLean, Jr. | 411/93 |
| 4,625,385 | 12/1986 | Kohler et al. | 29/240 X |
| 4,739,680 | 4/1988 | Ecker et al. | 81/13 |

Primary Examiner—Charlie T. Moon
Attorney, Agent, or Firm—Peterson, Wicks, Nemer & Kamrath

[57] ABSTRACT

Each dual wheel assembly on a tractor or trailer system includes outer and inner wheels mounted on a plurality of studs projecting from a hub. The inner wheel is held in place on the studs by a number of flanged cap nuts and the outer wheel is held in place by a number of wheel nuts. When unthreading the wheel nuts to remove the outer wheel, some of the cap nuts invariably remain engaged with the wheel nuts whereas the cap nuts should all remain engaged with the threaded studs during this step. The device disclosed herein is in the form of a ring having a number of hexagonal holes therein corresponding to the number of wheel nuts so that the ring can be placed over those wheel nuts remaining engaged with their cap nuts to prevent rotation of the wheel nuts when each cap nut is individually spun out through the back side of the removed outer wheel. The ring obviates the need for individually holding each wheel nut with a wrench when the cap nut that has remained threadedly engaged therewith is being spun out through the back side of the removed outer wheel.

5 Claims, 4 Drawing Sheets

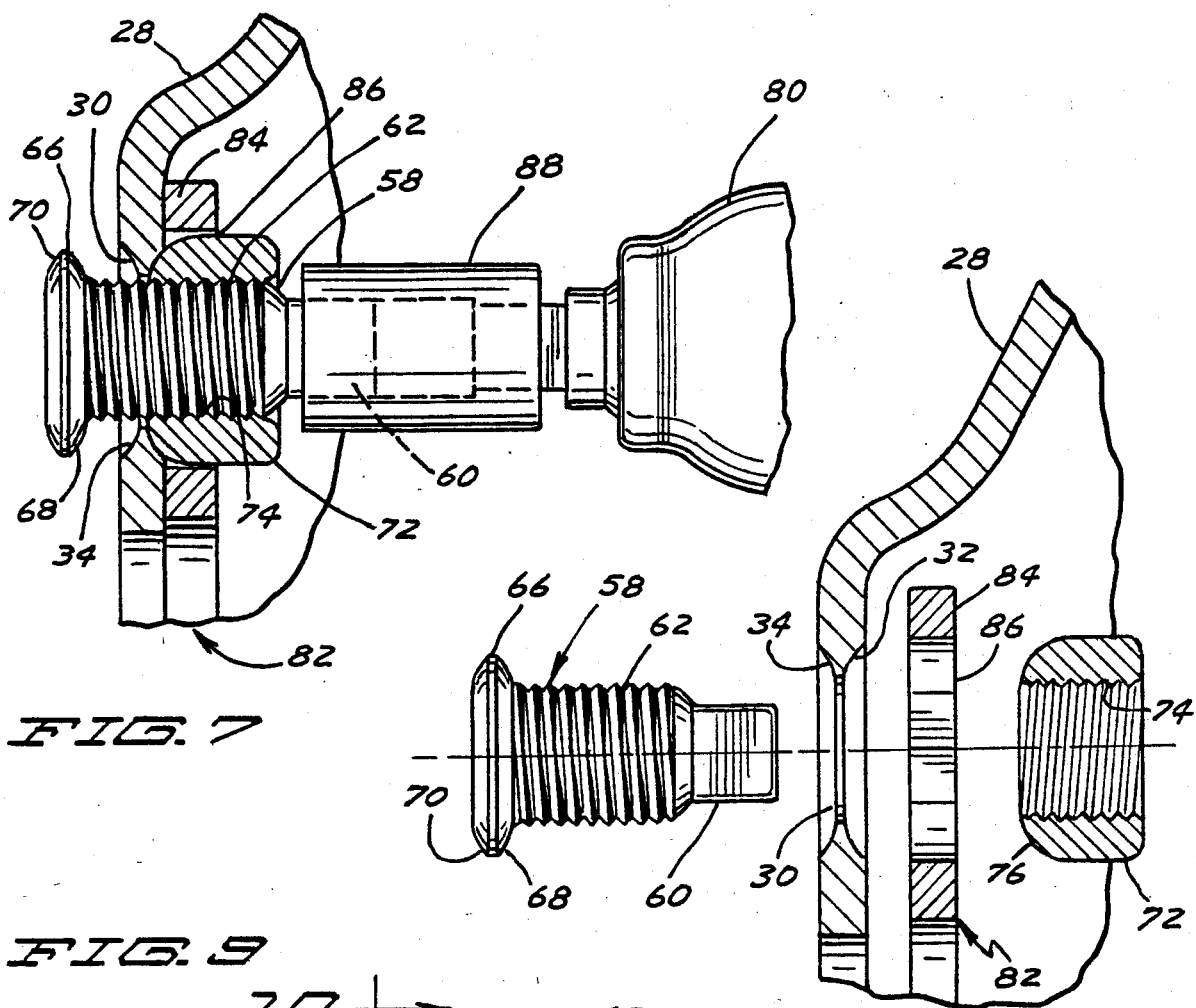
*FIG. 7*
*FIG. 9*
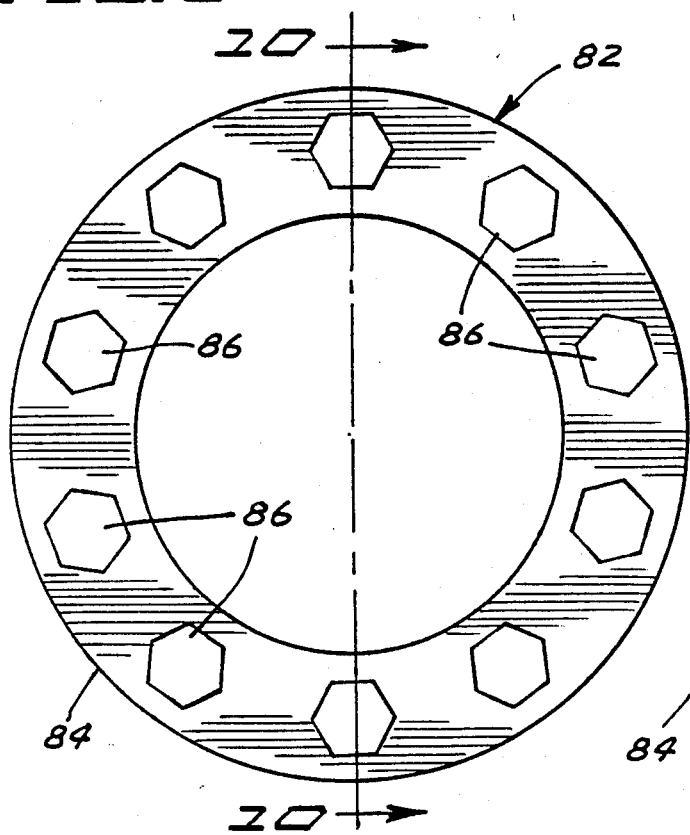
*FIG. 8*
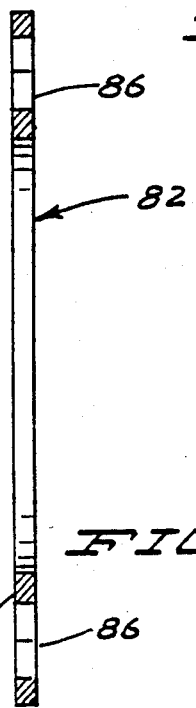
*FIG. 10*

METHOD AND DEVICE FOR REMOVING WHEEL NUTS AND CAP NUTS FROM THE OUTER WHEEL OF A DUAL-WHEEL DOUBLE-NUT SYSTEM

BACKGROUND OF THE INVENTION

1. Field of the Invention

This invention relates generally to a method and device for facilitating the removal of wheel nuts from cap nuts after the outer wheel has been removed from a tractor or trailer, and pertains more specifically to a method and device for servicing ten-hole Budd double-nut wheel systems.

2. Description of the Prior Art

The so-called Budd ten-hole dual-wheel double-nut system has been widely adopted. Such a system utilizes cap nuts for holding the inner wheel on the hub, the cap nuts being internally threaded so as to engage the threaded studs projecting from the wheel's hub. The cap nuts are externally threaded so that larger wheel nuts can be threaded thereon, the larger wheel nuts holding the outer wheel in place.

The Budd system has proved exceptionally reliable and is widely employed on many modern-day trucks and tractors. However, when removing the wheels to change tires, some of the cap nuts are apt to come off with the wheel nuts. This happens quite frequently and necessitates individually holding each wheel nut with a wrench while spinning its still engaged cap nut out the back side of the outer wheel after the outer wheel has been removed. Injuries have occurred when following this procedure. The mechanic or tire changer, as the case may be, usually is faced with having to change tires as rapidly as possible, frequently at a truck stop while the truck driver is waiting. To have to individually hold each wheel nut while the cap nut is being spun free thereof is bothersome. While the time per wheel assembly is not great, the cumulative amount of time for changing tires on a number of wheel assemblies becomes appreciable. Consequently, the need exists for some means of expediting the unthreading of the cap nut and wheel nut from each other when the two remain engaged after removal of the outer wheel from a Budd dual-wheel double-nut system.

SUMMARY OF THE INVENTION

Accordingly, an important object of my invention is to facilitate the removal of wheel nuts and cap nuts from the outer wheel of a Budd dual-wheel double-nut system.

Another object of the invention is to provide a device for expediting the removal of wheel and cap nuts from an outer wheel of a Budd dual-wheel double-nut system that will be easy to use and which will accommodate whatever number of wheel nuts remaining engaged with cap nuts so that each cap nut can be successively spun free thereof.

Yet another object of the invention is to provide a device of the foregoing character that will be inexpensive, long-lasting, and exceptionally rugged and virtually unbreakable, thereby encouraging its purchase and widespread use by truck mechanics and tire changers.

Also, the invention has for an object a device that will be compact, occupying very little space when not in use.

The invention also has an additional object the avoidance of injuries that have occurred in the past when using a wrench to hold the wheel nut while spinning off the cap nut. More specifically, the mechanic or tire changer has held such a wrench with his foot, but the wrench has at times inadvertently slipped out from under the user's foot and rotated with the consequence that the rotating wrench strikes the user's foot, doing so frequently after first having damaged the wheel.

Briefly, my invention envisages a nut holding device in the form of a ring having a prescribed number of hexagonal holes therein, the number of holes corresponding to the number of studs employed in the mounting of dual wheel double-nut systems. When the outer wheel is removed by unthreading the wheel nuts from the cap nuts engaged with the studs on the wheel's hub, it frequently happens that a number of cap nuts come off the studs, remaining engaged with their wheel nuts. The device holds whatever number of wheel nuts having the cap nuts still threadedly engaged therewith while the mechanic or tire changer, utilizing an air wrench, spins the particular cap nut rearwardly through the back side of the outer wheel, the device holding that particular wheel nut, as well as others, during this spinning procedure. The device holds whatever number of wheel nuts that require holding, which can be from one to ten in a Budd double-nut wheel system.

BRIEF DESCRIPTION OF THE DRAWINGS

FIG. 7 is a sectional view taken in the direction of line 7—7 of FIG. 4 showing to better advantage how my device prevents the various wheel nuts from rotating while the cap nuts are being spun free thereof;

FIG. 8 is an exploded view of the outer wheel after the cap nut has been spun free of the wheel nut and removed via the back side of the outer wheel, my device sectionally appearing between the outer wheel and the wheel nut;

FIG. 9 is a plan view of my device, and

FIG. 10 is sectional view taken in the direction of line 10—10 of FIG. 9.

DESCRIPTION OF THE PREFERRED EMBODIMENT

Figure 1:
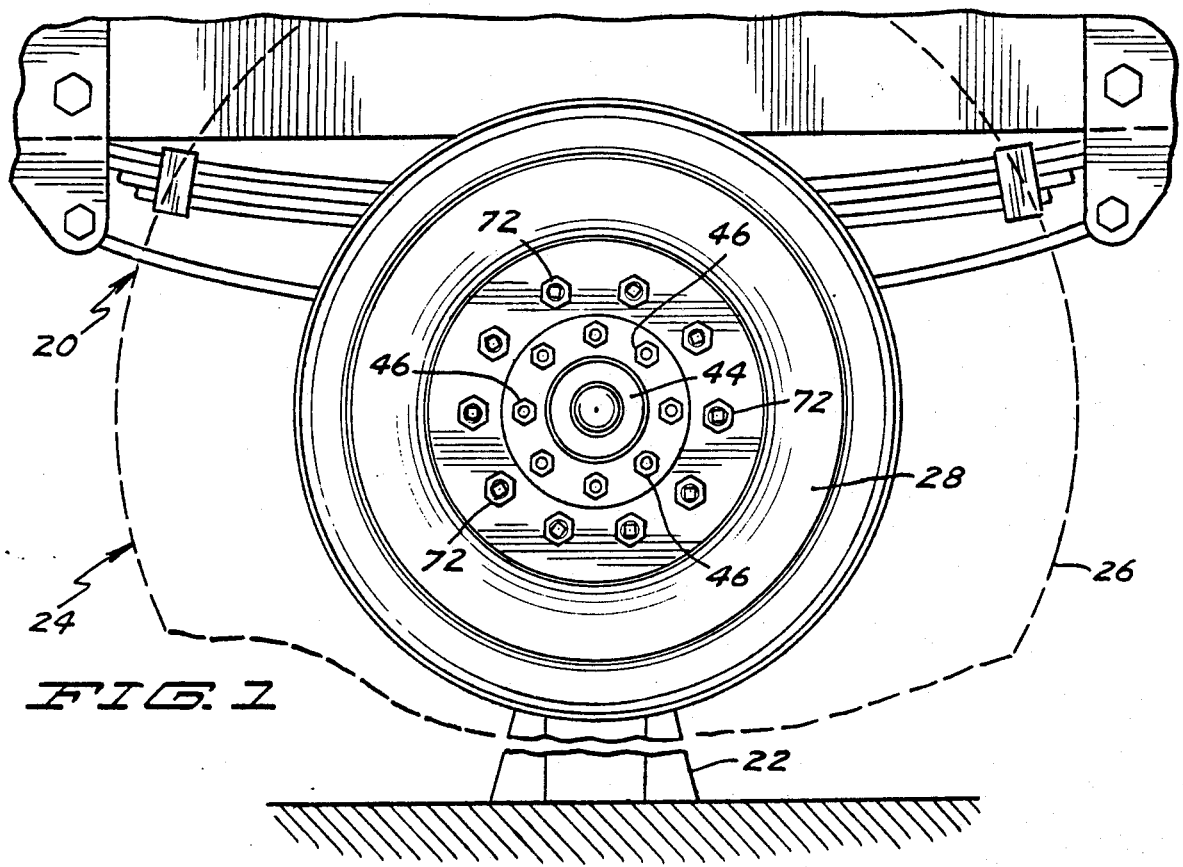
FIG. 1 is an elevational view of a fragmentarily depicted portion of an over-the-road trailer, the wheel assembly appearing therewith having been jacked up in preparation for the removal of the assembly's dual wheels.
Figure 2:
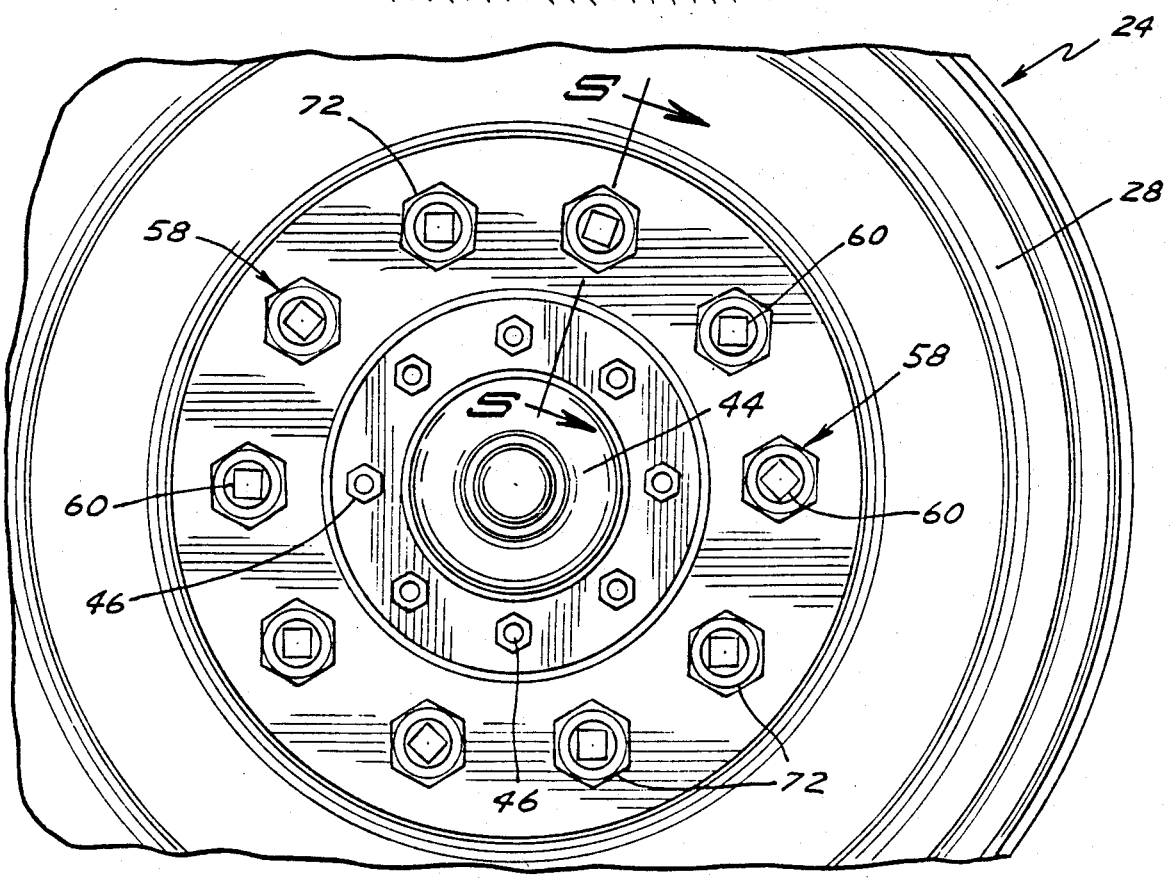
FIG. 2, an enlarged view corresponding to FIG. 1 (but with upper and lower portions of the wheel assembly having been removed) so as to show to better advantage the various wheel nuts and to some extent the cap nuts onto which the wheel nuts are threadedly attached.

In order to appreciate the benefits to be derived from a practicing of my invention, it is believed desirable to illustrate the structural arrangement employed in the widely used Budd ten-hole dual-wheel double-nut system. First, a trailer frame 20 has been fragmentarily pictured in FIG. 1, the frame 20 being raised by means of a jack 22. The wheel assembly has been denoted generally by the reference numeral 24 and for the sake of completeness a tire 26 has been shown in phantom outline, although the tire 26 will have at this stage been removed from the assembly 24.

Describing now in detail the construction of the wheel assembly 24, it will be appreciated that it includes an outer wheel 28 having ten holes 30 formed therein, each with an outer ball seat 32 and an inner ball seat 34. The wheel assembly 24 additionally includes an inner wheel 36 having holes 38 formed with outer and inner ball seats 40 and 42. The outer and inner wheels 28 and 36 are duplicates of each other; however, when mounted, the relationship of each is reversed with respect to the other.

Attention is now directed to a hub cap 44 held by bolts 46 threaded into tapped holes 48 in a hub 50 having a flange 52 integral therewith. As is conventional, a number of threaded studs 54, actually ten, because the Budd system, uses this number, are anchored in the flange 52 of the hub 50, projecting outwardly through a brake drum 56. A cap nut 58 has a square head 60, external threads 62 internal threads 64 (FIG. 6) and an integral flange 66 at the end thereof opposite the square head 60, the flange 66 being formed with convex annular ball segments 68 and 70. As can be seen from FIG. 5, the ball segment 70 engages the ball seat 40 of the inner wheel 36.

Thus, when initially mounting the inner wheel 36, the mechanic or tire changer threads each cap nut 58 onto a stud 54, alternating the tightening procedure according to a prescribed pattern that need not be discussed herein. It is after the cap nuts 58 have been threaded onto the studs 54 that the outer wheel 28 is mounted, the ball seats 34 of its holes 30 having the ball segments 68 of the flanges 66 on the cap nuts 58 bearing thereagainst. It is then that the various wheel nuts 72 having threads 74 are threaded onto the external threads 62 of the cap nuts 58 so that the annular ball segments 76 on the nuts 72 engage the ball seats 32 associated with the various holes 30 of the outer wheel 28.

Figure 5:
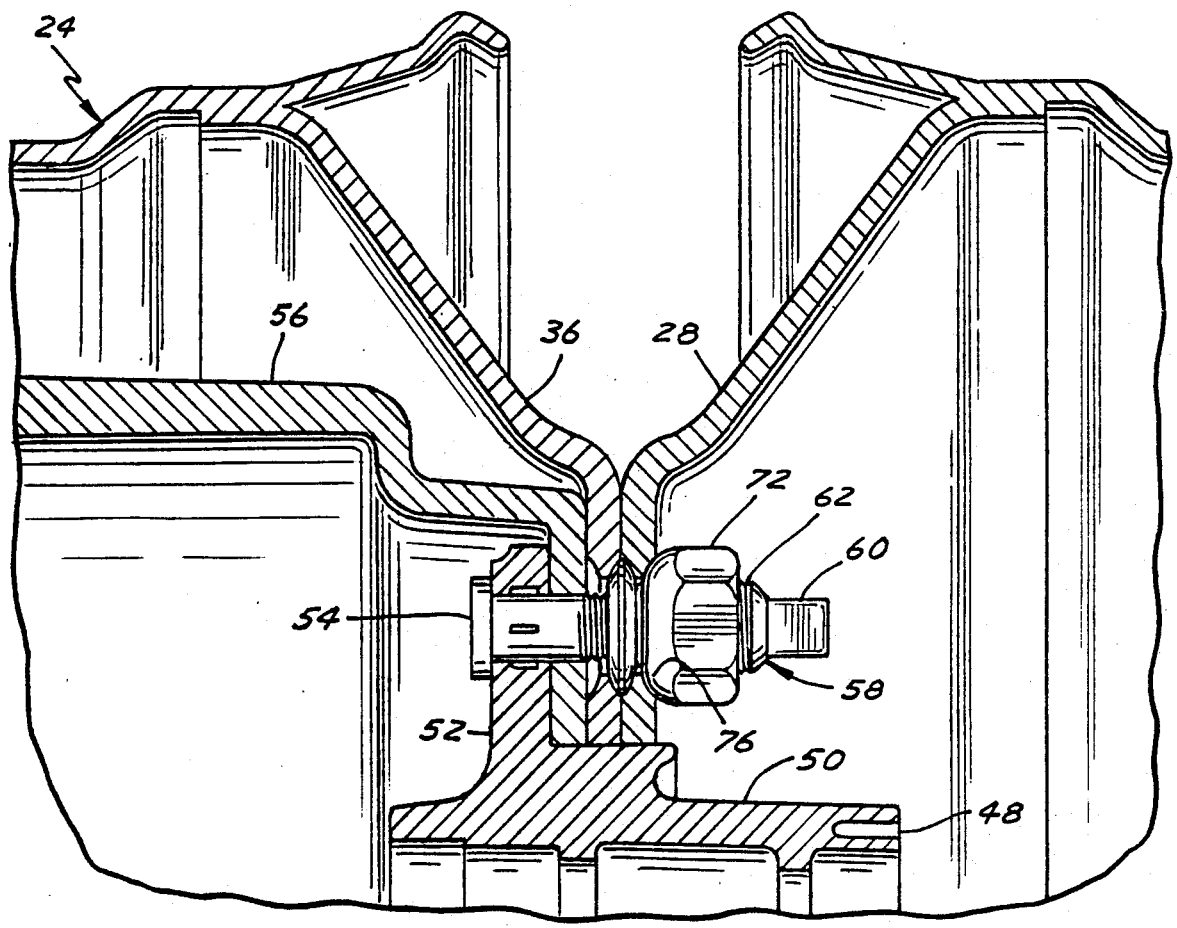
FIG. 5 is a sectional detail taken in the direction of line 5—5 of FIG. 2 for the purpose of showing how the inner and outer wheels are mounted on the hub studs.
Figure 6:
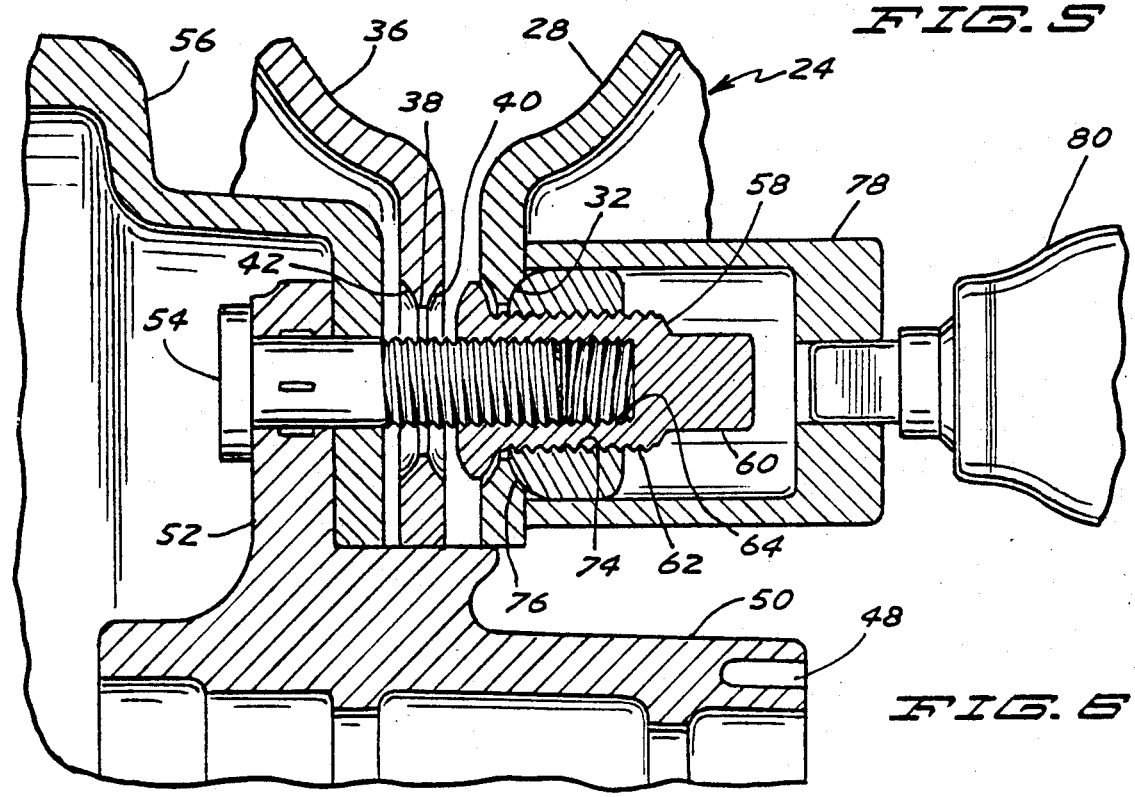
FIG. 6 is a sectional view taken in the direction of line 6—6 of FIG. 3 for the purpose of showing how the wheel nuts are loosened with an air wrench.

The foregoing, as previously indicated, has been presented in order that the benefits to be derived from my invention can be more fully appreciated. It is when the outer wheel 28 has been removed from the studs 54 that my invention finds considerable usefulness. FIG. 5 depicts the wheel nut 72 appearing in this FIG. in its tightened condition. However, each of the wheel nuts 72 must be progressively loosened in the process of removing the outer wheel 28. FIG. 6 is presented to show what occurs. Thus, the wheel nut 72 appearing in this view has been loosened through the agency of an air wrench 80 and the hexagonal socket 78 mounted thereon.

The mechanic or tire changer, when removing the various wheel nuts 72, naturally hopes that each wheel nut 72 will unthread itself from the external threads 62 on the cap nuts 58. However, the desired separation of all of the wheel nuts 72 from the cap nuts 58 only happens occasionally. What usually happens is that some of the cap nuts 58 become disengaged from the studs 54. It must be recognized that the exposed threads 62 of the various cap nuts 58 project beyond the wheel nuts 72 and are vulnerable to accumulating dirt, dust, grime and various abrasives during over-the-road trips which can easily prevent the desired relative rotation of some of the wheel nuts 72 relative to the cap nuts 58 with which such cap nuts are engaged. In this regard, the internal threads 64 of the cap nuts are well protected and thus are far more readily unthreaded or disengaged from the threads on the studs 54 than are the threads 74 of the wheel nuts .72 relative. to the external threads 52 of the cap nuts 58. Hence, an unpredictable number of cap nuts 58 become detached from the studs 54. This can be anywhere from one to ten.

It is after the outer wheel 28 has been removed that my holding device 82 plays an important role. The device 82 constitutes in the illustrated instance a ring 84 provided with ten hexagonal holes 86 of a size and shape to receive therein any number of the wheel nuts 72. In the depicted situation of FIG. 3, six of the cap nuts 58 remain threadedly engaged with six of the wheel nuts 72. The ratio of six to four has been rather arbitrarily selected, but it should be understood that the number, as already indicated, can vary from one to ten. When all of the wheel nuts 72 come off without any of the cap nuts 58 being detached from the studs 54, the mechanic or tire changer will not need to use my holding device 82.

Figure 3:
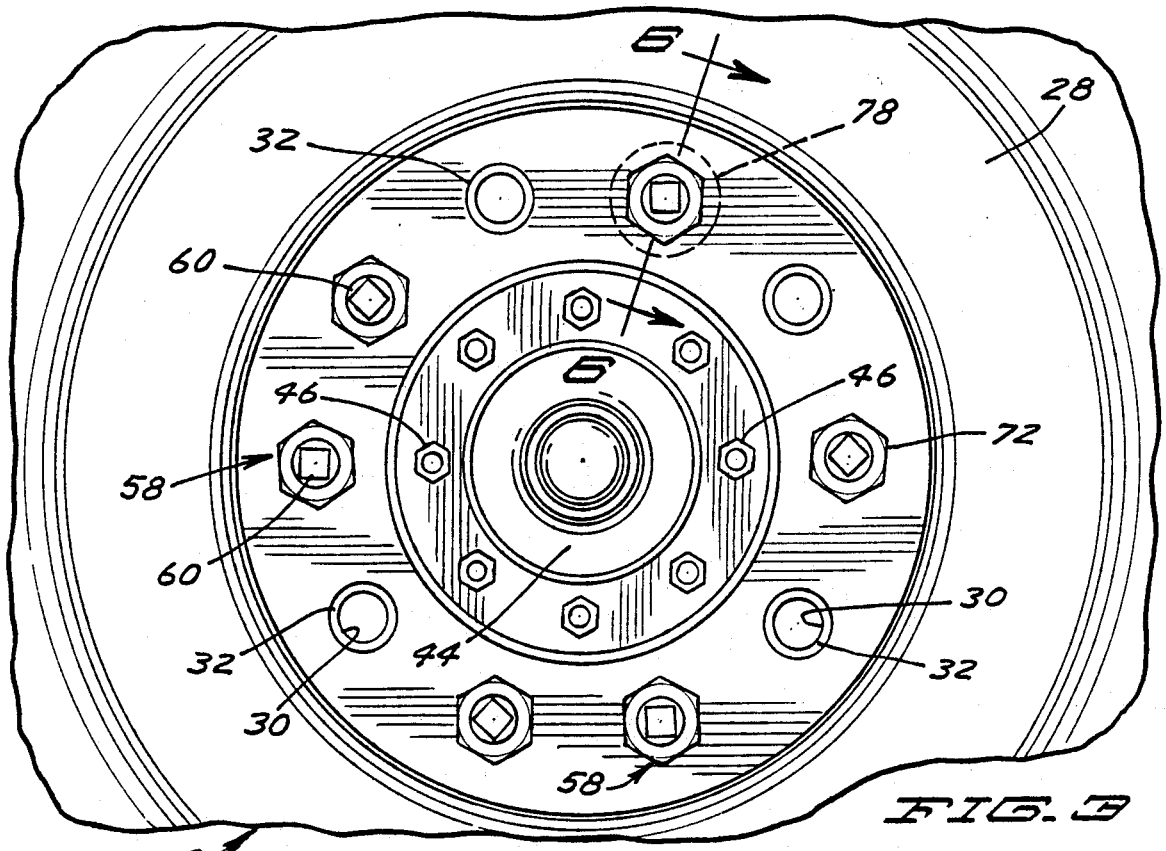
FIG. 3 illustrates the outer wheel in the process of being removed from the inner wheel.
Figure 4:
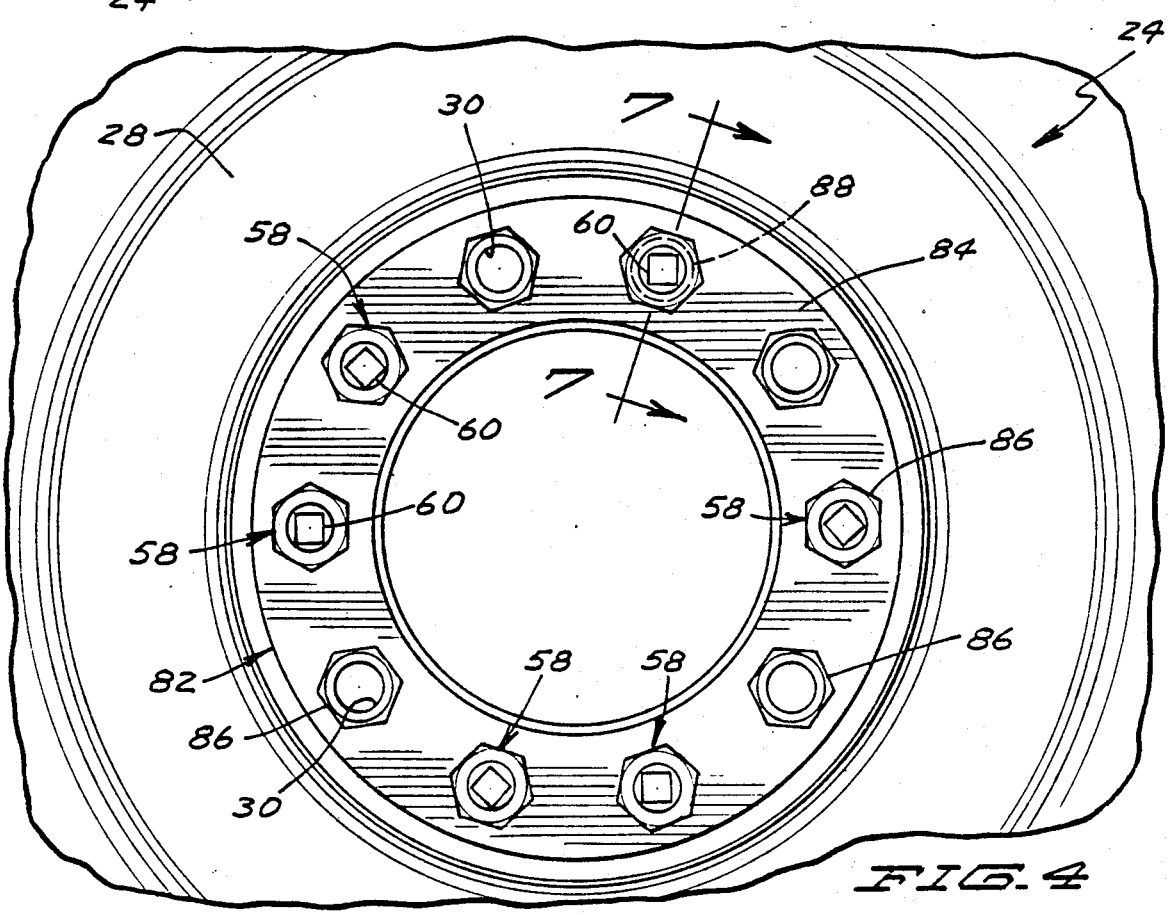
FIG. 4 illustrates the outer wheel after it has been removed and with my device in use for the purpose of facilitating the spinning free of one of the cap nuts from the wheel nut with which it has remained engaged.

However, when any number of the wheel nuts 72 and cap nuts 58 remain engaged, such as the six that have been illustrated in FIG. 3, all that the mechanic or tire changer has to do is to place my device 82 over the remaining wheel nuts 72 so as to prevent the remaining wheel nuts 72 from rotating. Having done this, the mechanic or tire changer only has to spin successively each of the various cap nuts 58 that have remained engaged with the wheel nuts 72. This step is illustrated in FIG. 7 where a socket 88 is shown engaged with the square head 60 on the cap nut 58 shown in this view, the same air wrench 80 being used. The cap nuts 58 in this way are advanced rearwardly so as to become unthreaded or disengaged from the wheel nuts 72. In other words, the cap nuts 58 are spun out through the back side of the outer wheel 28. The removal of the cap nuts 58 through the back side of the outer wheel 28 is believed readily understandable by comparing the relationship shown in FIG. 8 with that shown in FIG. 7. It will be recognized from FIG. 6 that whatever wheel nuts 72 and cap nuts 58 remain have been sufficiently loosened so that any change in angular relationship can be manually effected very readily by simply twisting the nuts 72 so that they are angularly oriented and thus receivable in the various hexagonal holes 86 in the ring member 84. Whatever inter-engaged wheel nuts 72 and cap nuts 58 remain are readily disengaged one at a time once my holding device 82 has been placed over the remaining wheel nuts 72. This is a decided saving of the mechanic's or tire changer's time because whatever number of remaining wheel nuts 72 and their still captive cap nuts 58 can be quickly disengaged by simply successively and individually spinning each so-held cap nut 58 with the air wrench 80 and the socket 78, as illustrated in FIG. 7 so as to effect the complete removal of each cap nut 58 via the back side of the outer wheel which is the left side as viewed in FIGS. 5-8.

I claim:

1. A method of removing cap nuts from the outer wheel after the outer wheel has been removed from the inner wheel of a tractor or trailer comprising the steps of placing a flat annular ring having a plurality of hexagonal openings therein shaped so as to simultaneously receive therein whatever hexagonal wheel nuts remain threadedly engaged with their cap nuts, the ring having inner and outer circular edges and the number of said hexagonal openings corresponding to the total number of wheel nuts on said outer wheel with said hexagonal openings complementing said hexagonal wheel nuts and being disposed between said inner and outer edges and being equally spaced from each other throughout said annular ring, and then individually spinning each such cap nut out through the back side of said outer wheel while said remaining wheel nuts are prevented from rotating by reason of being received in certain of said hexagonal openings in said ring.

2. A method of removing inner and outer dual wheels from a tractor or trailer having a hub and a number of threaded studs projecting therefrom wherein the inner wheel is held in place by an equal number of flanged cap nuts having internal threads engaged with the threaded studs and said outer wheel is held in place by an equal number of hexagonal wheel nuts threadedly engaged with external threads on said cap nuts, the method comprising the steps of removing said outer wheel from said studs, angularly orienting those wheel nuts remaining threadedly engaged with their cap nuts, placing a flat annular ring having a number of hexagonal openings therein complementing said hexagonal wheel nuts and corresponding to the number of threaded studs and wheel nuts, said openings being hexagonally shaped and oriented to accommodate said wheel nuts and being capable of preventing rotation of all of said wheel nuts by reason of said wheel nuts having been angularly oriented, the angular orientation of said wheel nuts corresponding to that of said hexagonally shaped openings, and then successively rotating each cap nut remaining engaged with a wheel nut in a direction to disengage each cap nut from its wheel nut without repositioning said ring while those wheel nuts remaining engaged with their cap nuts are received in certain of said hexagonal openings to permit removal of each cap nut that is so detached through the back side of said outer wheel.

3. In combination, a wheel having a plurality of holes therein, flanged cap nuts residing in at least some of said holes, wheel nuts threadedly attached to said cap nuts, and a flat annular ring of uniform thickness throughout having a number of equally spaced holes therein hexagonally shaped and angularly oriented to simultaneously receive all of said wheel nuts therein when angularly oriented to correspond to the angular orientation of said hexagonally shaped holes to prevent rotation of as many of said wheel nuts that remain engaged with said cap nuts when said cap nuts are spun relative to said remaining wheel nuts to enable each such cap nut to be disengaged from the wheel nut with which it has remained engaged and to pass out through the back side of said wheel.

4. The combination of claim 3 in which said wheel nuts are on one side of said wheel and said cap nuts each have an integral flange on the other side of said wheel, whereby said ring holds as many of said wheel nuts that remain so as to permit spinning of whatever number of said cap nuts that remain in order to disengage said cap nuts from said remaining wheel nuts and thereby allow removal of said cap nuts from the other side of said wheel.

5. A device for facilitating the removal of ten wheel nuts from ten cap nuts each having a flange thereon wherein the ten wheel nuts are threadedly engaged with said ten cap nuts with said wheel nuts residing on one side of the wheel and the flanges of said cap nuts residing on the other side of said wheel, the device consisting of a flat annular ring of uniform thickness throughout having ten angularly and equally spaced hexagonal holes formed therein which are located completely around said annular ring, said holes being capable of simultaneously receiving all ten of said wheel nuts therein, said annular ring having an inner circular edge and an outer circular adge, said ten holes being located generally midway between said inner and outer circular edges, and said ring having a uniform thickness throughout.

* * * * *